United States Patent [19]
Ulichney et al.

[11] Patent Number: 6,038,576
[45] Date of Patent: Mar. 14, 2000

[54] BIT-DEPTH INCREASE BY BIT REPLICATION

[75] Inventors: Robert A. Ulichney, Stow; Shiufun Cheung, Waltham, both of Mass.

[73] Assignee: Digital Equipment Corporation, Maynard, Mass.

[21] Appl. No.: 08/982,954

[22] Filed: Dec. 2, 1997

[51] Int. Cl.[7] .................................................. G06F 7/00
[52] U.S. Cl. ............................................................. 708/208
[58] Field of Search .................................. 708/200, 203, 708/204, 208, 209, 400; 341/95

[56] References Cited

U.S. PATENT DOCUMENTS

| | | |
|---|---|---|
| 4,411,009 | 10/1983 | Martinson .................................. 377/47 |
| 4,983,966 | 1/1991 | Grone et al. ................................ 341/84 |
| 5,497,436 | 3/1996 | Miller ....................................... 382/298 |
| 5,793,315 | 8/1998 | Baker ......................................... 341/53 |

*Primary Examiner*—Chuong Dinh Ngo
*Attorney, Agent, or Firm*—Jenkens & Gilchrist

[57] ABSTRACT

A method for bit-depth increasing digital data represented by a first number of original bits which are sequentially ordered beginning with a start bit and ending with an end bit. To bit-depth increase the data, in an expanded presentation, the original bits are replicated in the sequential order starting with the start bit to form replication bits. The original bits are appended with a second number of the replication bits to form the expanded presentation of the digital data. The appended replication bits start with the start bit and are in the sequential order of the original bits.

7 Claims, 11 Drawing Sheets

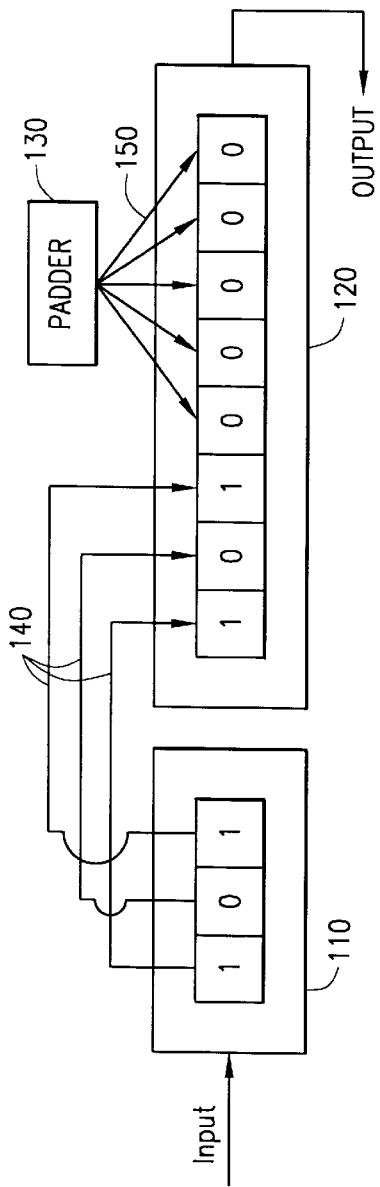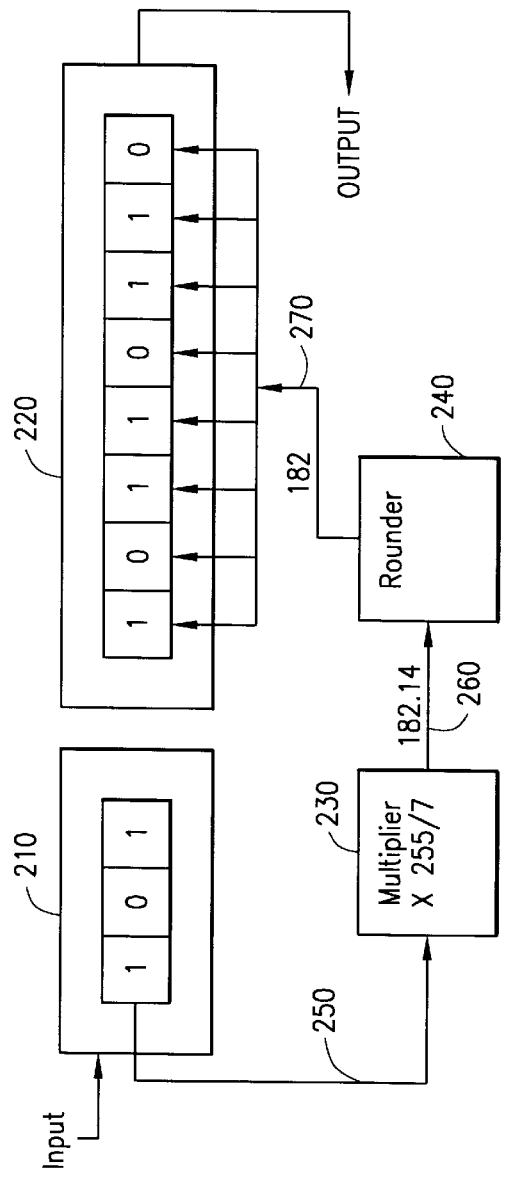
FIG. 1
(PRIOR ART)
FIG. 2
(PRIOR ART)

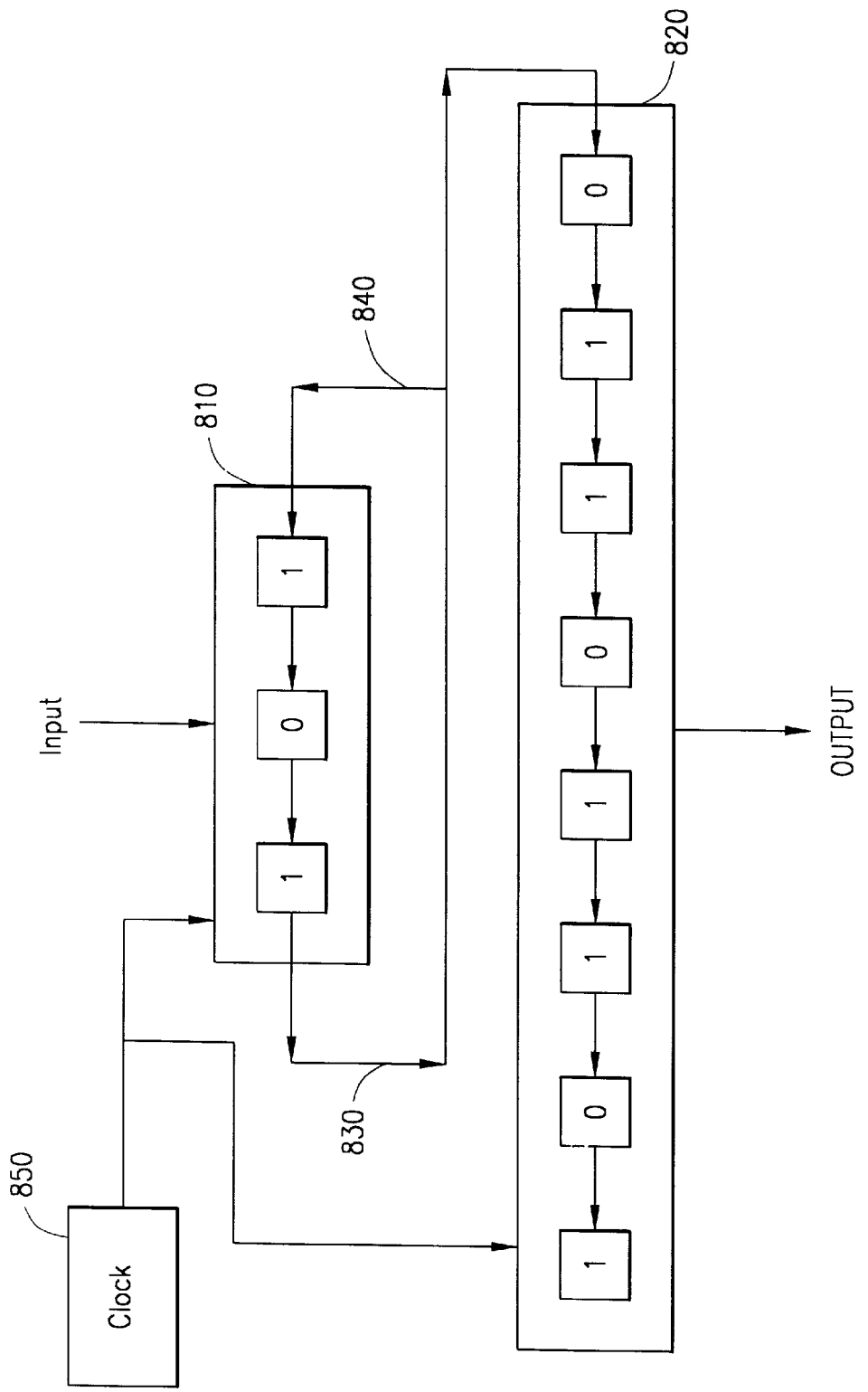

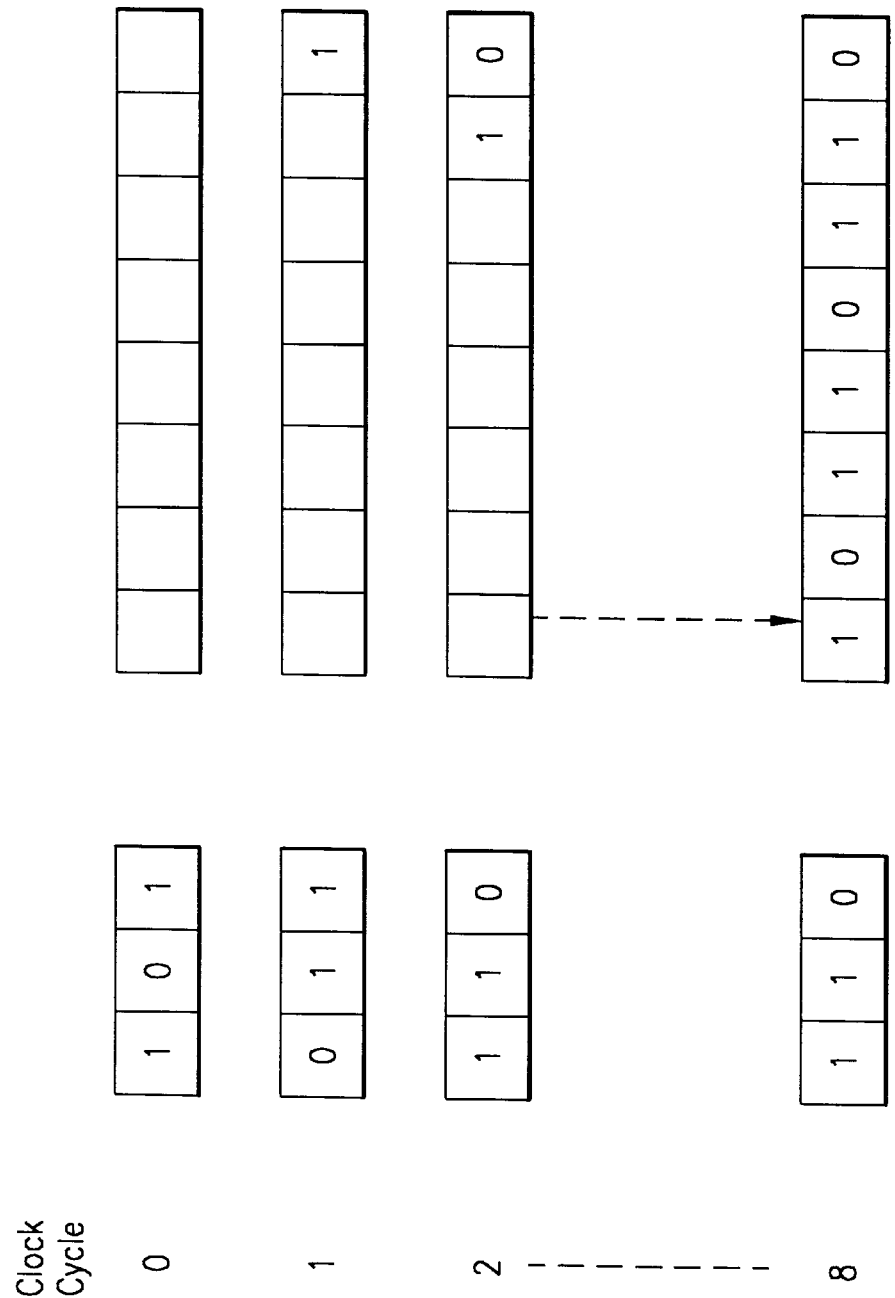

| Input | | Output | | Ideal | Error |
|---|---|---|---|---|---|
| 00000 | (0) | 00000000 | (0) | 0.00 | 0.00 |
| 00001 | (1) | 00001000 | (8) | 8.23 | −0.23 |
| 00010 | (2) | 00010000 | (16) | 16.45 | −0.45 |
| 00011 | (3) | 00011000 | (24) | 24.68 | −0.68 |
| 00100 | (4) | 00100001 | (33) | 32.90 | 0.10 |
| 00101 | (5) | 00101001 | (41) | 41.13 | −0.13 |
| 00110 | (6) | 00110001 | (49) | 49.35 | −0.35 |
| 00111 | (7) | 00111001 | (57) | 57.58 | −0.58 |
| 01000 | (8) | 01000010 | (66) | 65.81 | 0.19 |
| 01001 | (9) | 01001010 | (74) | 74.03 | −0.03 |
| 01010 | (10) | 01010010 | (82) | 82.26 | −0.26 |
| 01011 | (11) | 01011010 | (90) | 90.48 | −0.48 |
| 01100 | (12) | 01100011 | (99) | 98.71 | 0.29 |
| 01101 | (13) | 01101011 | (107) | 106.94 | 0.06 |
| 01110 | (14) | 01110011 | (115) | 115.16 | −0.16 |
| 01111 | (15) | 01111011 | (123) | 123.39 | −0.39 |
| 10000 | (16) | 10000100 | (132) | 131.61 | 0.39 |
| 10001 | (17) | 10001100 | (140) | 139.84 | 0.16 |
| 10010 | (18) | 10010100 | (148) | 148.06 | −0.06 |
| 10011 | (19) | 10011100 | (156) | 156.29 | −0.29 |
| 10100 | (20) | 10100101 | (165) | 164.52 | 0.48 |
| 10101 | (21) | 10101101 | (173) | 172.74 | 0.26 |
| 10110 | (22) | 10110101 | (181) | 180.97 | 0.03 |
| 10111 | (23) | 10111101 | (189) | 189.19 | −0.19 |
| 11000 | (24) | 11000110 | (198) | 197.42 | 0.58 |
| 11011 | (25) | 11001110 | (206) | 205.65 | 0.35 |
| 11010 | (26) | 11010110 | (214) | 213.87 | 0.13 |
| 11011 | (27) | 11011110 | (222) | 222.10 | −0.10 |
| 11100 | (28) | 11100111 | (231) | 230.32 | 0.68 |
| 11101 | (29) | 11101111 | (239) | 238.55 | 0.45 |
| 11110 | (30) | 11110111 | (247) | 246.77 | 0.23 |
| 11111 | (31) | 11111111 | (255) | 255.00 | 0.00 |
| | | | | average error | 0.00 |

*FIG. 11*

| Input | | Output | | Ideal | Error |
|---|---|---|---|---|---|
| 0000 | (0) | 000000000000 | (0) | 0.00 | 0.00 |
| 0001 | (1) | 000100010001 | (273) | 273.00 | 0.00 |
| 0010 | (2) | 001000100010 | (546) | 546.00 | 0.00 |
| 0011 | (3) | 001100110011 | (819) | 819.00 | 0.00 |
| 0100 | (4) | 010001000100 | (1092) | 1092.00 | 0.00 |
| 0101 | (5) | 010101010101 | (1365) | 1365.00 | 0.00 |
| 0110 | (6) | 011001100110 | (1638) | 1638.00 | 0.00 |
| 0111 | (7) | 011101110111 | (1911) | 1911.00 | 0.00 |
| 1000 | (8) | 100010001000 | (2184) | 2184.00 | 0.00 |
| 1001 | (9) | 100110011001 | (2457) | 2457.00 | 0.00 |
| 1010 | (10) | 101010101010 | (2730) | 2730.00 | 0.00 |
| 1011 | (11) | 101110111011 | (3003) | 3003.00 | 0.00 |
| 1100 | (12) | 110011001100 | (3276) | 3276.00 | 0.00 |
| 1101 | (13) | 110111011101 | (3549) | 3549.00 | 0.00 |
| 1110 | (14) | 111011101110 | (3822) | 3822.00 | 0.00 |
| 1111 | (15) | 111111111111 | (4095) | 4095.00 | 0.00 |
| | | | | average error | 0.00 |

*FIG. 12*

BIT-DEPTH INCREASE BY BIT REPLICATION

TECHNICAL FIELD

The present invention relates generally to digital data computation and more particularly to increasing the numerical precision of digital data.

BACKGROUND ART

When measuring items, scales of different degrees of precision can be used. For example, one can measure things on a scale with three division marks (zero to two), or on a scale of the same magnitude with ten division marks (zero to nine). Scales with more divisions are of higher precision than scales with fewer divisions. On a computer, because of processing and storage limitations, numerical values are also represented with varying degrees of precision. For example, one can use two bits (a scale of zero to three) to represent a numerical value or use five bits (a scale of zero to thirty-one) to represent the same numerical value. The number of bits used to represent a numerical value is generally referred to as the "bit depth."

While it saves storage space for numerical data to be represented with low bit depth, it is sometimes useful to increase the precision of the stored data for processing and other purposes. For example, it might be efficient to have video data stored as 4-bit pixel values and then increase the precision to 8 bits for display. In these scenarios, one would be required to map the full range of the original lower scale to the full range of the new higher scale. In the previous example, a zero in the 4-bit value will map a zero in the 9-bit value whereas a 15 will map to a 255.

This bit-depth increase can be formally characterized as follows. For data with a bit-depth of q, the level $L_i$ will be from the range $$L_i \in \{0,1,2, \ldots, 2^q-1\}.$$

This input data is to have their bit-depth increased to m to yield output levels of $L_o$ from the range $$L_o \in \{0, \ldots, 2^m-1\}.$$

This can be achieved by performing a multiplication by an ideal gain, $$G = \frac{2^m - 1}{2^q - 1}$$

followed by rounding to the nearest integer:

$$L_o = \text{Round}\{G \times L_i\}.$$

A number of techniques have been proposed for expanding the number of bits representing particular data. A conventional technique commonly used in computer graphics is to expand the number of bits by simply padding the originally received bits with additional zero-bits to represent the data. Using such a technique, zero-bits are appended to the received data bits to expand the bit length to the desired number of bits.

For example, if data represented by 3 bits is expanded to 8 bits using the above-described conventional technique, the number 7 which is represented by 3 one-bits, can be represented by 3 one-bits followed by 5 zero-bits in an expanded 8-bit representation.

As will be recognized by those skilled in the art, a 3-bit representation can be used to represent the numbers 0 to 7 while an 8-bit representation can be used to represent the numbers 0 to 255. Hence, a 3-bit representation of the number 7 would ideally be expanded into an 8-bit representation of the number 255. However, as shown in FIG. 1, by simply padding the original bits with 0 bits to form the 8-bit representation, the gain is less than ideal. Therefore, the padded data is an imprecise representation of the original data.

To obtain an exact solution, the number represented by the original data bits could be multiplied by the desired gain ratio. For example, in the bit-depth increase shown in FIG. 1, the desired gain ratio is 255/7. Accordingly, to precisely subject any number represented by the original 3 bits to bit-depth increase, the number can be up-multiplied by the gain ratio and this up-multiplied number will be represented by the 8 bits of the expanded data representation. However, this requires a multiplier and would therefore add to the processing overhead required to subject the original data to bit-depth increase. As will be recognized by those skilled in the art, multipliers can be quite expensive and are typically implemented in hardware. Further, since multiplying the number represented by the original 3 bits by the gain ratio will not necessarily result in an integer number, the result of the up-multiplying must be rounded to the nearest integer and hence the 8-bit representation is less than perfect. Thus, even more processing time and hardware expense may be required only to obtain a near perfect bit-depth increase.

FIG. 1 depicts a prior art bit-depth increaser which includes a 3-bit input register 110 having a set of three registers and an 8-bit output register 120 having a set of eight registers. The three registers of the input register 110 are hard wired to the three most significant bit registers in the output register 120 via connectors, e.g., wires 140. A padder 130 is hard wired via connectors 150 to the remaining registers, i.e., the five least significant bit registers of the output register 120. As will be recognized by those skilled in the art, the 3-bit input register 110 is capable of storing numbers 0–7 while the 8-bit output register 120 is capable of storing numbers 0–255. As depicted, the input register 110 stores input data representing the numeric 5. To bit-depth increase the input data to an expanded 8 bit representation, the input data is mapped and transmitted from input register 110 to the output register 120 via connectors 140 for storage as the 3 most significant bits in the noted sequence. The remaining registers of the output register 120 are padded by the padder 130 with zeros transmitted via the wires or connectors 150. The output register 120 outputs an imprecise approximation of the numeric 5 in an 8-bit format as represented by the values in the eight registers of the output register 120.

As noted above, to improve the precision of the output signal, the bits stored in the input register could be up-multiplied by the precise gain factor and result stored in the output register using an 8-bit representation. As shown in FIG. 2, an input register 210 stores a 3-bit representation of input data. As indicated in FIG. 2, the stored bits in input register 210 represent the numeric 5. The stored information is transmitted from input register 210 to the multiplier 230 via the connector 250. The multiplier 230 up-multiplies the numeric 5 by the gain factor 255/7 to compute a corresponding 8-bit value which will more precisely bit-depth increase the 3-bit input data stored in the input register 210. As shown in FIG. 2, the result of this multiplication equals a non-integer number, i.e., 182.14, which is transmitted via connector 260 to a rounder 240. The number is then rounded to the nearest integer value, i.e., 182, and represented by the 8-bits stored in the output register 220. A more precise 8-bit representation of the 3 bit input data has thus been formed and can be output from output register 220 for use by, for example, an 8-bit processor.

FIGS. 3A–3C detail the bit-depth increase process as the data passes through the system of FIG. 2. FIG. 3A depicts the 3 input bits representing the numeric 5 which are stored in the input register 210 and transmitted to the multiplier 230 via the connector 250. FIG. 3B depicts the bit-depth increased signal as it is output from the multiplier 230 after having been subject to bit depth increase. As shown, the multiplier outputs eight integer bits 320A, which are transmitted via connectors 260 to the rounder 240, representing the numeric 182 and includes four fractional bits 320B representing the numeric 0.14. The rounder 240 rounds the received data to the nearest integer value. Accordingly, as shown in FIG. 3C, the 8-bit representation output from rounder 240 to the output register 220 via connector 270 represents a numeric value equalling 182. If, for example, the fractional bits had equalled more than 0.50, the numeric value represented in FIG. 3C would have been 183. Here again, it should be noted that the 8-bit data represented by the bits 330 is less than precise due to rounding error.

As discussed above, a significant expense is involved in implementing the multiplier 230 and rounder 240 shown in FIG. 2. Additionally, the multiplying and rounding increase the signal processing time to obtain an expanded signal. Thus, although the system depicted in FIG. 2 provides a more precise representation of the input data as compared to that shown in FIG. 1, the enhanced precision comes at a significant cost in terms of both system cost, hardware requirements, and processing time.

OBJECTIVES OF THE INVENTION

Accordingly, it is an objective of the present invention to provide an accurate representation of digital data in an expanded form without requiring additional processor hardware.

It is another object of the present invention to provide an accurate representation of digital data in an expanded form without requiring significant processing overhead.

It is yet another object of the present invention to provide an accurate representation of digital data in an expanded form without using multiplication and rounding.

Additional objects, advantages, and novel features of the present invention will become apparent to those skilled in the art from this disclosure, including the following detailed description, as well as by practice of the invention. While the invention is described below with reference to preferred embodiment(s), it should be understood that the invention is not limited thereto. Those of ordinary skill in the art having access to the teachings herein will recognize additional implementations, modifications, and embodiments, as well as other fields of use, which are within the scope of the invention as disclosed and claimed herein and with respect to which the invention could be of significant utility.

SUMMARY DISCLOSURE OF THE INVENTION

In accordance with the invention, digital data represented by a number of sequentially ordered original bits, which start with a most significant bit and end with a least significant bit, is subject to bit-depth increase to form digital data having an expanded bit-length. To form the longer bit-length representation of the digital data, the original bits are replicated to form replication bits. The original bits are appended with a number of the replication bits, starting with the most significant bit of the original bits, to bit-depth increase the digital data. The appended replication bits are in the same sequential order as the original bits. The number of replication bits equals the number of bits in the expanded bit length less the number of original bits. That is, replicated original bits in the sequential order of the original bits are iteratively appended to the original bits until the fully extended bit-length representation of the digital data has been formed. Hence, all or a portion of the original bits may be replicated once or more than once to form the replication bits. The number of replication bits appended to the original bits may replicate a greater number of some than other of the original bits.

If more replication bits are created than are necessary to form the expanded bit-length representation of the digital data, the replication bits which are not appended to the original bits are discarded. That is, any fractional replication bits are simply ignored. Thus, if the number of bits in the desired expanded bit length representation divided by the number of original bits equals a non-integer number, all fractional bits are dropped.

In one embodiment of the invention, an apparatus for bit-depth increasing digital data includes a number of input registers and a greater number of output registers. The input registers are configured to store the sequentially ordered original data bits starting with a most significant and ending with a least significant bit. The output registers are configured to store the original data bits and replication bits.

A number of connectors, equaling the number of output registers is provided. Each of the connectors is configured to connect one of the input registers to one of the output registers. Each of the input registers is connected to at least one output register. The input register storing the most significant bit is connected to multiple of the output registers. Depending on the desired expansion, other input registers may also be connected to multiple output registers. Preferably, the connectors are configured to connect each of the output registers to only one of the input registers.

The connectors are also preferably configured so that the sequentially ordered original data bits are stored as the most significant bits in the output registers. The replication bits replicate all or a portion of the original data bits and are stored in the sequential order of the original data bits as the least significant bits in the output registers. By properly configuring the connectors, replication bits can be formed to replicate all or any portion of the original data bits more than once, e.g., some of the original data bits may be replicated more than other of the original data bits.

In a second embodiment, the replicating apparatus includes an input shift register and an output shift register. As will be understood by those skilled in the art, the sequential order of data stored in a shift register does not change each time data is transmitted from and/or received by the register. The input shift register has a number of registers configured to store original data bits. The original data bits are initially stored within the input shift register in a sequential order starting with the most significant bit and ending with the least significant bit. The output shift register is configured to store the original data bits and a number of replication data bits representing replicated original bits in the sequential order of the original data bits.

A first connector connects the input shift register to the output shift register so that the sequentially ordered original data bits are transmitted from the input shift register to the output shift register. A second connector connects the first connector to the input shift register so that each of the transmitted original data bits is also transmitted back to the first shift register for storage in one of its registers. The original data bits are continuously transmitted in the sequential order, i.e., cycled, from the first shift register to the second shift register via the first connector until the second shift register is full.

The connectors are preferably configured so that the sequentially ordered original data bits are stored as the most significant bits in the full output shift register, and the replication bits replicate one or more of the original data bits and are stored as the least significant bits in the output shift register in the sequential order of the original data bits. Here again, the replication bits may replicate one or more, and potentially all, of the original data bits more than once depending on the number of original bits and the desired expanded bit length representation of the digital data.

BRIEF DESCRIPTION OF DRAWINGS

FIG. 1 depicts a prior art bit-depth increase system.

FIG. 2 depicts another prior art bit-depth increase system.

FIG. 8 depicts a third embodiment of bit-depth increase system in accordance with the present invention.

FIG. 9 depicts the bit shifting performed by the FIG. 4 system in accordance with the present invention.

FIG. 11 is a table showing the error in the replicated value for various input and output values obtainable using the replication systems depicted in FIGS. 4, 6 and 8.

FIG. 12 depicts a table similar to FIG. 11 but for different input and output bit lengths.

BEST MODE FOR CARRYING OUT THE INVENTION

Figure 3A:
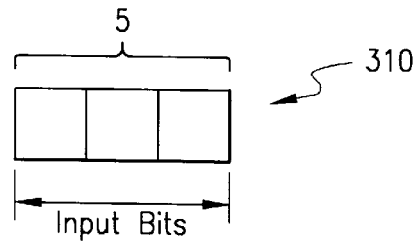
FIGS. 3A–3C depict the bit-depth increase performed by the FIG. 2 system.
Figure 3B:
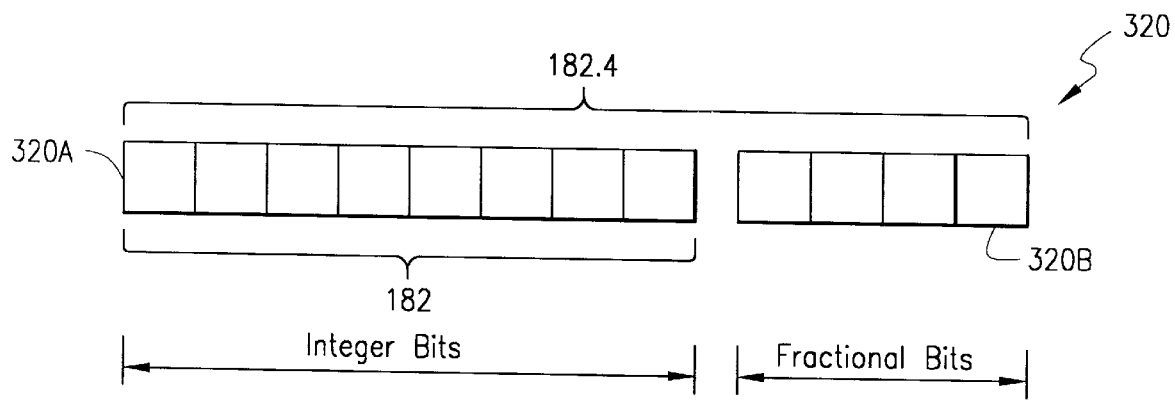
Figure 3C:
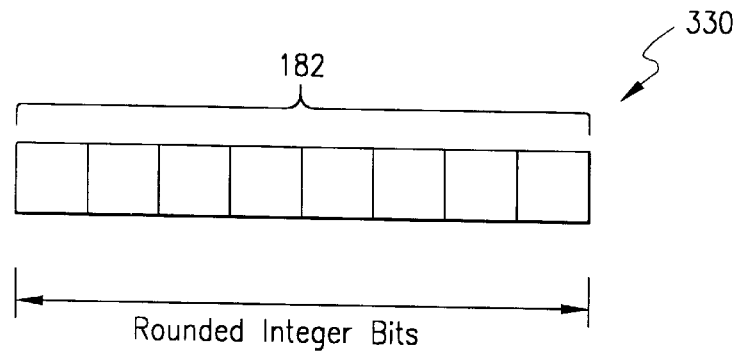
Figure 4:
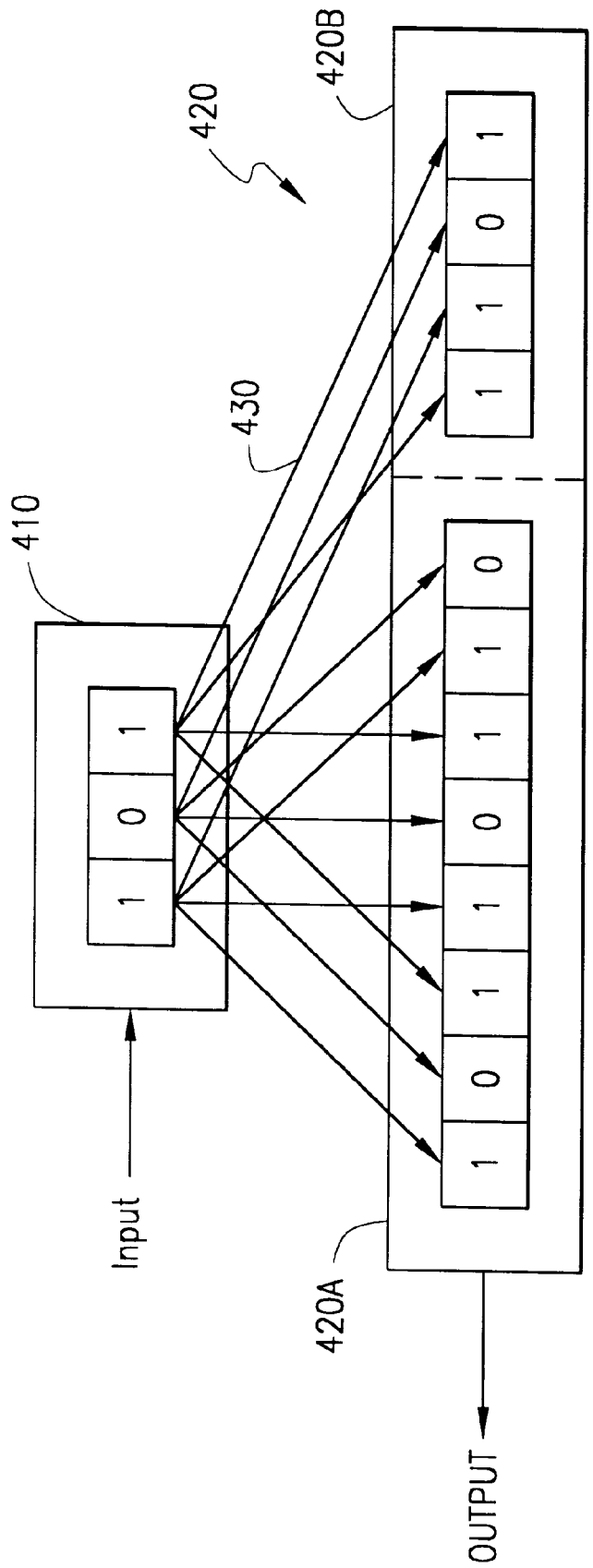
FIG. 4 depicts a first embodiment of a bit-depth increase system in accordance with the present invention.

FIG. 4 depicts a bit-depth increase system in accordance with the present invention, the system includes an input register 410 for receiving input data. The input register 410 includes three bit registers which are shown to store a 3-bit representation of the numeric 5, similar to the input registers 110 and 210 of prior art FIGS. 1 and 2. Each of the registers within the input register 410 is hard wired to multiple registers within the output register 420 by connectors 430. It will of course be understood that although the preferred embodiments are described herein with reference to specific input and output bit lengths, the described systems and their operation can be easily adapted for any input and output bit lengths. The output register 420 has a subset of registers, indicated as portion 420A for storing integer bits and a portion 420B for storing fractional bits. As shown, the respective registers of input register 410 are mapped to both portions of the output register 420. Accordingly, both integer and fractional bits are stored in output register 420. The bit values stored in the input register 410 are mapped to the registers in the output register 420 such that the values stored in input register 410 are replicated over and over in a cyclic manner in the registers of output register 420. Hence, as shown in FIG. 4 the result is that the original bits represented by the 3 most significant bits stored in the output register 420 are appended with replication bits which replicate the original bits in their original sequence to form the redundant bits.

Accordingly, the data output from the output register 420 is only that data stored in output register portion 420A. As will be discussed further below, rounding of the integer bit value stored in the output register portion 420A could actually decrease the precision of the expanded representation.

Figure 5A:
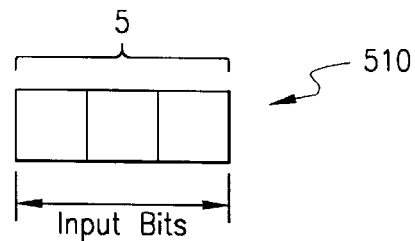
FIGS. 5A–5C depict the bit-depth increase performed by the FIG. 4 system in accordance with the present invention.
Figure 5B:
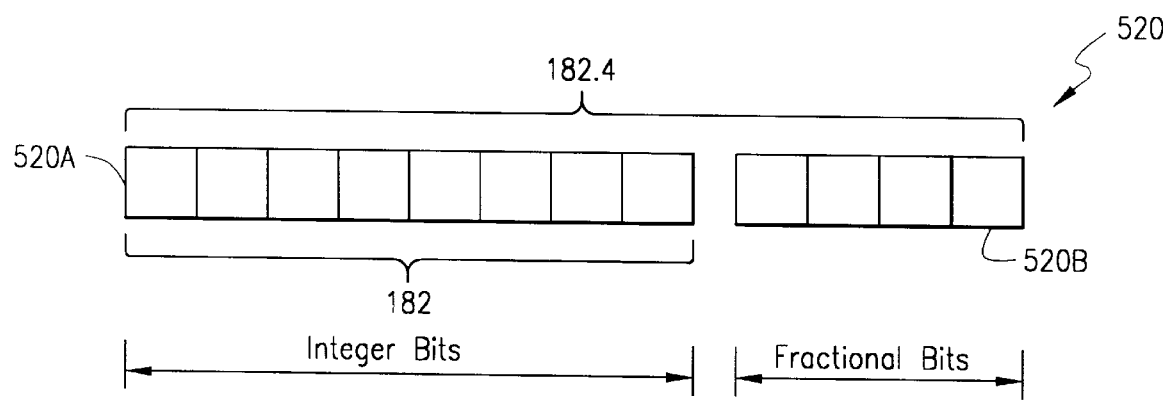
Figure 5C:
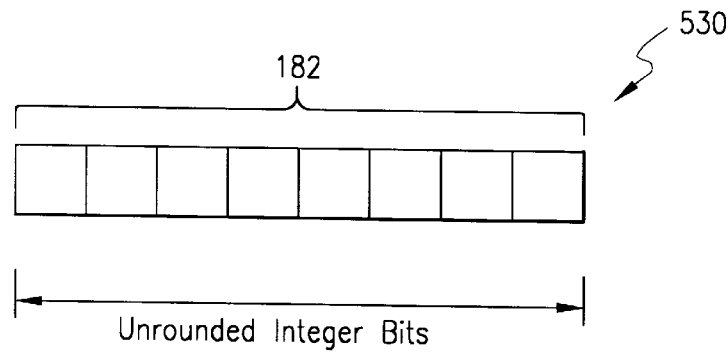

FIGS. 5A–5C depict the bit replication performed by the replication system of FIG. 4. As shown, the 3 input bits 510 representing the numeric 5 are expanded into the 8-integer-bit and 4-fractional-bit representation 520 equalling 182.13. The total expanded representation includes the 8 bits representing the integer 182 designated as 520A and the 4 bits representing the fractional portion of the replicated data 0.13 designated 520B. In FIG. 5C the output bits 530 consist solely of the unrounded 8 integer bits corresponding to the numeric 182. The fractional bits 520B are ignored and discarded.

Figure 6:
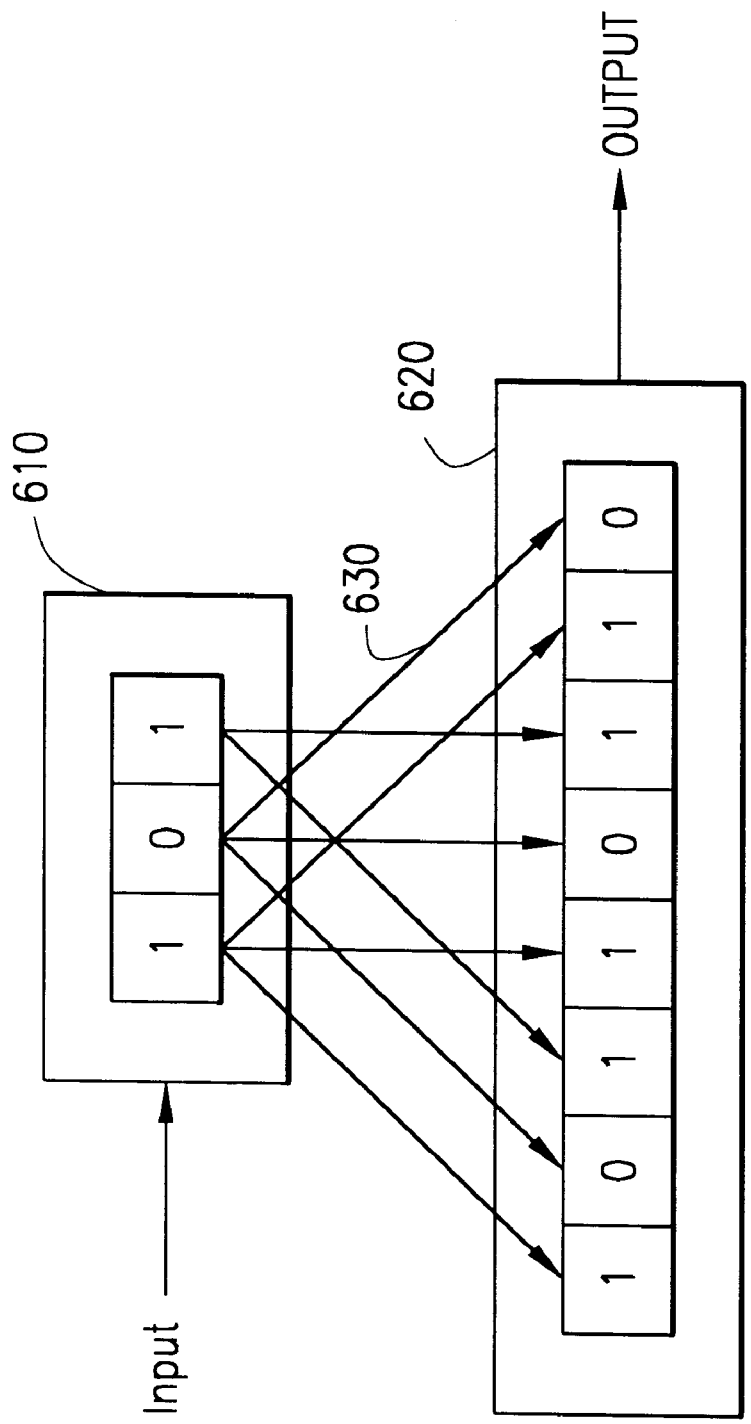
FIG. 6 depicts a second embodiment of a bit-depth increase system in accordance with the present invention.

FIG. 6 depicts a further embodiment of a bit-depth increase system in accordance with the present invention. In FIG. 6 the input register 610 is similar to the register 410 of FIG. 4, except the register 610 is hard wired only to registers within the output register 620 which will store integer bits. Hence, no fractional bits are stored in the output register 620. Connectors 630 connect the respective registers of the input register 610 to the appropriate registers of the output register 620.

Figure 7A:
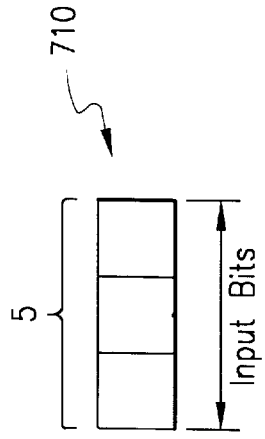
FIGS. 7A–7B depict the bit-depth increase performed by the FIG. 6 system in accordance with the present invention.
Figure 7B:
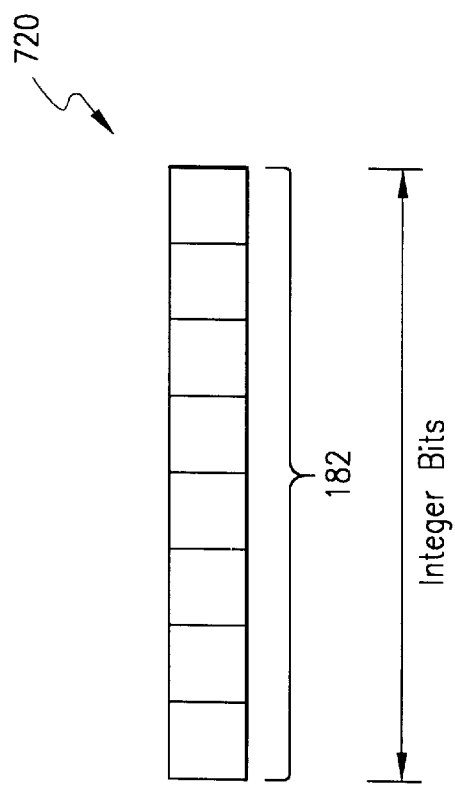

FIGS. 7A and 7B depict the bit-depth increase performed by the system of FIG. 6. As shown, the original 3 bits 710 representing the input data stored in the input register 610 are bit-depth increased into the 8 integer bits 720 representing the numeric 182 as shown in FIG. 7B.

FIG. 8 depicts yet another embodiment of a bit-depth increase system in accordance with the present invention. As shown, the system includes an input register 810 for receiving a 3-bit input signal. The input register 810 is shown to be a shift register which initially stores a 3 bit representation of the numeric value 5.

During operation of the replication system, the most significant bit stored within the register is transmitted to the output shift register 820 via the connector 830. Upon transmission of the most significant bit from the input shift register 810, each bit stored within the input register 810 is shifted forward one register. For example, in a first shift during a first cycle of clock 850, the bit value 1 is transmitted via connector 830 from the input register 810 and the bit value 0 is shifted to the register vacated by the transmitted bit value. The least significant 1 bit stored in input register 810 is also moved forward to become the second most significant bit stored in the input register 810.

The transmitted bit value 1 is also transmitted by via connector 840 from the connector 830 back to the input register 810 and stored as the least significant bit within the register 810. The transmitted bit is also initially stored in the register of output register 820 which will ultimately store the least significant bit of the bit-depth increased data. Accordingly, in a first shift the most significant bit 1 shown stored in the output register 820 was actually initially stored as the least significant bit in the far right register of the output shift register 820. Accordingly, by cycling through the sequenced bits initially stored in the input shift register 810 as necessary to fill the registers of the output shift register 820, integer bits representing the original input bits appended with duplicate replication bits can be formed as shown in the output register 820.

The actual bit-depth increase performed by the replication system depicted in FIG. 8 will be identical to that shown in FIGS. 7A and 7B. However, although the bit-depth increase system depicted in FIG. 6 forms the replication bits in parallel, the system depicted in FIG. 8 forms the replication bits serially.

As will be understood by those skilled in the art, FIG. 9 depicts the bit order in the input register 810 and output register 820 at different cycles of the clock 850 during the expansion of the input data bit length. As shown at clock cycle 0, the input data is in its original sequence in the input register 810. The output register is completely empty. At clock cycle 1 the most significant 1 bit is transmitted to the least significant bit of both the input register 810 and output register 820. At clock cycle 2, the 0 bit which was the most significant bit at the end of clock cycle 1 is transmitted to the least significant bit register of both the input register 810 and output register 820. This shifting and storage of the bits continues until the full development of the expanded bit length is stored in the output register 820. Simply replicating the original bits to form an expanded representation of the input data will result in an exact solution where the number of input bits and the number of output bits are exact integer multiples of each other. Further, if the input data value is 0, the exact output data value should also equal 0 and, hence, all input and output registers would store a zero-bit. Similarly, in the expansion from three to eight bits discussed above, if the input data value is 7, which would be represented by three 1-bits in the input register, by simply replicating the input data bits in the given sequence as replication bits, i.e. appending five 1-bits to the original bits, to form the expanded representation, a precise output data representation will be obtained.

However, in many cases, neither the number of input bits nor the input data value will be an integer multiple of the number of output bits. As discussed above, conventional techniques have utilized fractional bits for rounding to the nearest integer value in an attempt to improve the precision of the expanded bit representation. However, it has been found that the use of fractional bits and rounding to the nearest integer value can actually decrease the precision of the expanded representation of the input data. When the number of bits stored in the output register divided by the number of bits stored in the input register is a non-integer number, replication of the original bits as described above will, except in certain limited cases, result in an imprecise representation. Thus, all fractional bits are simply ignored or truncated and are not used. This provides a more precise expanded representation than that obtainable if the fractional bits are taken into account in the bit-depth increase.

Figure 10:
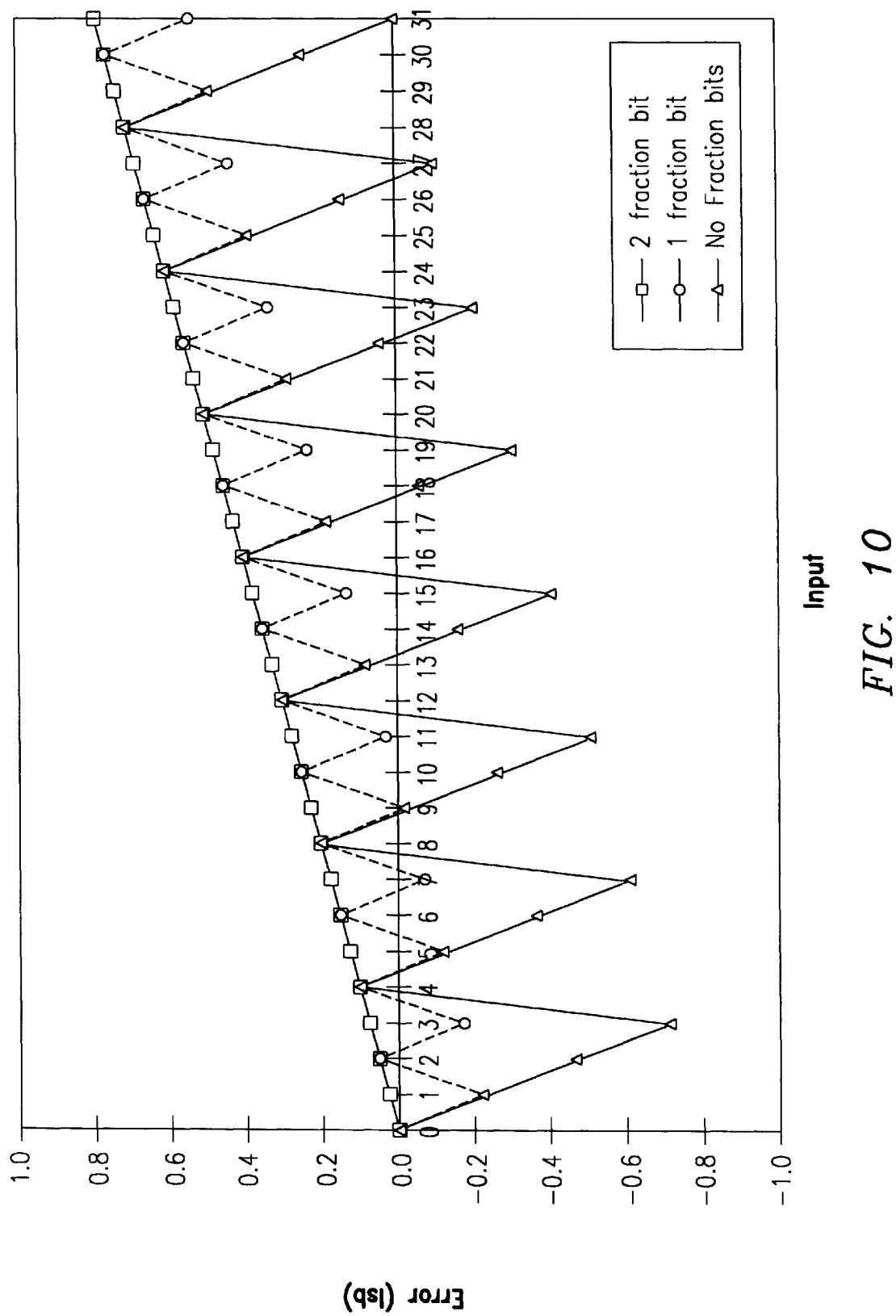
FIG. 10 depicts the output error as a function of the number of fractional bits retained.

Referring to FIG. 10, the output error as a function of the number of fractional bits retained is graphed. The specific graph shown is for the 5 bit input and 8 bit output. However, similar graphs can be easily generated for any number of input bits in relation to any number of output bits. As indicated, the graphs are developed in FIG. 10 for the cases of no fractional bits, of 1 fractional bit being considered, and of 2 fractional bits being considered. The graph shows the difference between the ideal, i.e. zero output error, and the error resulting if bit-depth increase is performed by replicating the original bits to either 0, 1 or 2 fractional bits. Looking at the ensemble error for all 32 inputs shown, if the fractional bits are dropped the average error is 0. Hence, by considering the contribution of the fractional bits a bias occurs. For example, as shown in the graph, with fractional bits considered a positive error bias occurs. This positive error bias is actually reduced slightly if only one, rather than two, fractional bit is considered. However, with no fractional bits considered, the average error is reduced to 0. Hence, doing less work is actually beneficial and the processing time overhead can be reduced while improving the results obtained. Accordingly, in the most preferred embodiment, only integer bits are bit-depth increased. Any bit-depth increase beyond the integer bits introduces a positive error bias.

FIG. 11 is a table charting an ideal solution for various input and output bit values associated with the expansion of data represented by 5 input bits to 8 output bits. As shown, the error in the resulting value using the above-described technique averages to 0 when no fractional bits are considered. It should be noted that all of the errors are less than 1. In certain limited cases the error is greater than 0.5. In these cases the solution is somewhat less precise than might be otherwise obtainable if fractional bits are considered when a multiplier is used. However, the cost associated with performing the rounding in those few cases in which it would be beneficial will, in practice, generally exceed the benefit to be gained. It should also be noted that the error is completely symmetrical. Any attempt at rounding could potentially affect the symmetry and thereby increase the overall average error. Hence, although somewhat better results may be obtainable using a multiplier and rounder as depicted in the prior art system of FIG. 2, nearly perfect results are obtainable at a significant cost reduction using the above-described technique and systems to expand the bit length of input data.

FIG. 12 depicts a table of the ideal value of the output bits as compared to the value of the output bits obtainable as described above for a 4 bit input expanded to a 12 bit output. Since the ratio of the output bits to the input bits is an integer number, the solution obtainable by simply replicating the original bits and appending the replicated bits to the original bits to form the output signal provides an exact output replication of the input signal. Hence, in cases where the ratio of the output bit length to the input bit length is an integer number, a perfect replication can be obtained without the need for multiplication or rounding. It will also be recognized by those skilled in the art that, while the invention has been described above in terms of one or more preferred embodiments, it is not limited thereto. Various features and aspects of the above described invention may be used individually or jointly. Further, although the invention has been described in the context of its implementation in a particular environment and for particular purposes, those skilled in the art will recognize that its usefulness is not limited thereto and that the present invention can be beneficially utilized in any number of environments and implementations. Accordingly, the claims set forth below should be construed in view of the full breadth and spirit of the invention as disclosed herein.

We claim:

1. An apparatus for bit-depth increasing digital data, comprising:
   an input shift register having a first number of registers configured to store original data bits;
   an output shift register having a second number of registers, the second number being greater than the first number, configured to store the original data bits and replication data bits representing replicated original bits;
   a first connector configured to connect the input shift register to the output shift register such that the original data bits are transmitted from the input shift register to the output shift register; and a second connector configured to connect the first connector to the input shift register such that each of the original data bits transmitted to the output shift register is also transmitted back to the first shift register for storage in one of the first number of registers;

wherein the original data bits are sequentially transmitted from the first shift register to the second shift register via the first connector until each of the second number of registers stores one of an original data bit and a replication bit.

2. An apparatus according to claim 1, wherein:

the input shift register initially stores the original data bits in a sequential order starting with a most significant and ending with a least significant bit.

3. An apparatus according to claim 2, wherein:

the replication bits represent replicated original bits in the sequential order.

4. An apparatus according to claim 2, wherein:

the original bits are transmitted from the input shift register to the output shift register in the sequential order.

5. An apparatus according to claim 1, wherein:

the original data bits are stored in the sequential order as the most significant bits in the output shift register, and the replication bits replicate one or more of the original data bits and are stored in the sequential order as the least significant bits in the output shift register.

6. An apparatus according to claim 1, wherein:

the replication bits replicate at least one of the original data bits more than once.

7. An apparatus according to claim 1, wherein:

the replication bits replicate some of the original data bits more than other of the original data bits.

* * * * *